United States Patent
Chang

(10) Patent No.: US 8,699,544 B2
(45) Date of Patent: Apr. 15, 2014

(54) SYSTEM AND METHOD FOR WIRELESS COMMUNICATIONS

(75) Inventor: Soo-Young Chang, Davis, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1429 days.

(21) Appl. No.: 12/114,597

(22) Filed: May 2, 2008

(65) Prior Publication Data

US 2009/0274195 A1 Nov. 5, 2009

(51) Int. Cl.
*H04B 1/00* (2006.01)

(52) U.S. Cl.
USPC .......... 375/145; 375/141; 375/140; 375/131; 333/150; 333/153; 333/155; 333/193; 333/196; 370/319; 370/320; 370/321; 370/330; 370/342; 370/345; 370/347

(58) Field of Classification Search
USPC .......... 375/145, 141, 140, 130; 333/150, 153, 333/155, 193, 196; 370/319, 320, 321, 330, 370/342, 345, 347
See application file for complete search history.

(56) References Cited

U.S. PATENT DOCUMENTS

| 6,115,410 | A | 9/2000 | Naruse | |
|---|---|---|---|---|
| 6,122,310 | A | 9/2000 | Ziemer et al. | |
| 6,301,287 | B1* | 10/2001 | Walley et al. | 375/140 |
| 6,359,875 | B1 | 3/2002 | Hamada et al. | |
| 6,483,828 | B1 | 11/2002 | Balachandran et al. | |
| 6,574,205 | B1 | 6/2003 | Sato | |
| 6,907,015 | B1 | 6/2005 | Moulsley et al. | |
| 2001/0043641 | A1* | 11/2001 | Harms et al. | 375/130 |
| 2002/0034171 | A1* | 3/2002 | Smith et al. | 370/337 |
| 2004/0057501 | A1* | 3/2004 | Balachandran et al. | 375/146 |
| 2005/0141641 | A1 | 6/2005 | Tanaka et al. | |
| 2005/0238053 | A1* | 10/2005 | Iochi et al. | 370/473 |
| 2006/0205423 | A1 | 9/2006 | Blair et al. | |
| 2009/0097460 | A1 | 4/2009 | Ji | |

FOREIGN PATENT DOCUMENTS

| CN | 1215949 A | 5/1999 |
|---|---|---|
| CN | 1299213 A | 6/2001 |
| CN | 1545787 A | 11/2004 |
| CN | 1638374 A | 7/2005 |
| CN | 1694373 A | 11/2005 |
| CN | 101026445 A | 8/2007 |
| WO | WO 03/017558 A2 | 2/2003 |
| WO | WO 2008/009229 A1 | 1/2008 |
| WO | WO 2009/132541 A1 | 11/2009 |

OTHER PUBLICATIONS

Chang, S.-Y., "New Code for Symbol-to-Chip Spreading for Multiple PPDs," IEEE P802.22-07/0538r0, Nov. 10, 2007, 8 pages.

(Continued)

*Primary Examiner* — Zewdu Kassa
(74) *Attorney, Agent, or Firm* — Slater & Matsil, L.L.P.

(57) ABSTRACT

System and method for enabling the cohabitation of licensed and unlicensed communications devices. A method comprises at a receiver, receiving transmitted data, demodulating the transmitted data to produce spread symbols, despreading the spread symbols to produce received data, wherein the despreading comprises using an orthogonal sequence selected from a list of orthogonal sequences for use by all transmissions in the wireless network, and processing the received data.

25 Claims, 3 Drawing Sheets

(56) References Cited

OTHER PUBLICATIONS

Written Opinion of the International Searching Authority, Applicant: Huawei Technologies Co., Ltd., et al., International Application No. PCT/CN2009/070970, Date of mailing: Jul. 2, 2009, 4 pages.

"Part 22.1: Enhanced Protection for Low-Power, Licensed Devices Operating in Television Broadcast Bands," IEEE Standards for Information Technology—Telecommunications and information exchange between systems—Local and metropolitan area networks—Specific requirements, P802.22.1/D2, Oct. 2007, 133 pages.

PCT Notification of Transmittal of the International Search Report and the Written Opinion of the International Searching Authority, International Application No. PCT/CN2009/071416, Applicant: Huawei Technologies Co., Ltd., et al., Jul. 30, 2009, 11 pages.

* cited by examiner

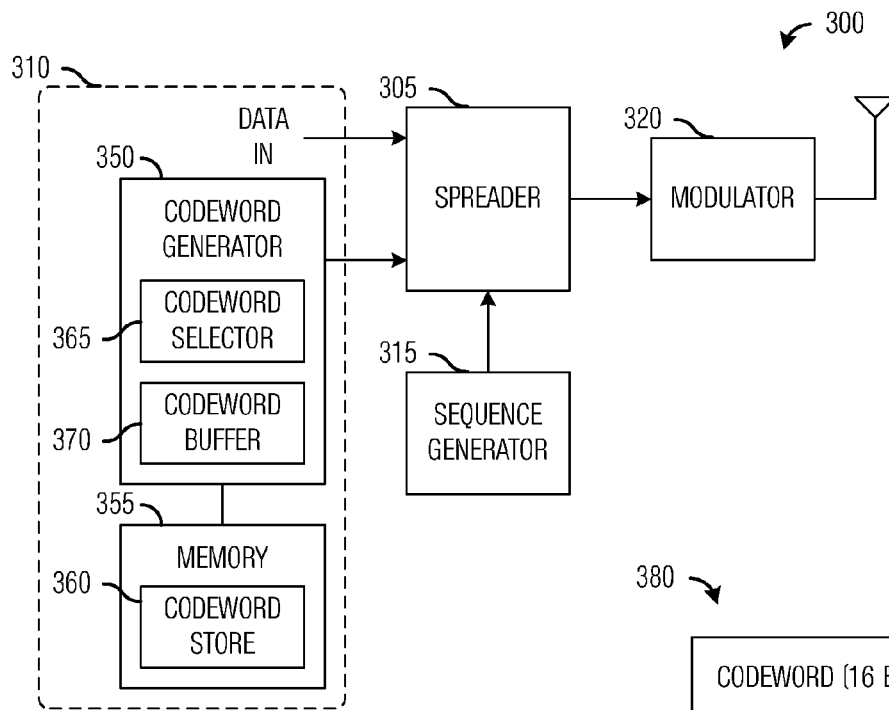
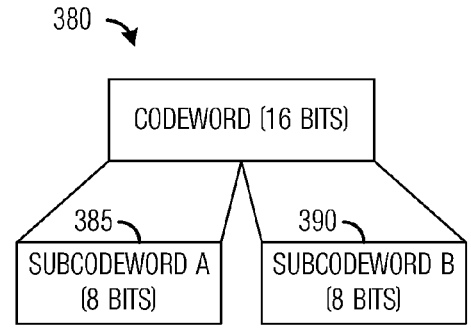
*Fig. 3a*
*Fig. 3b*
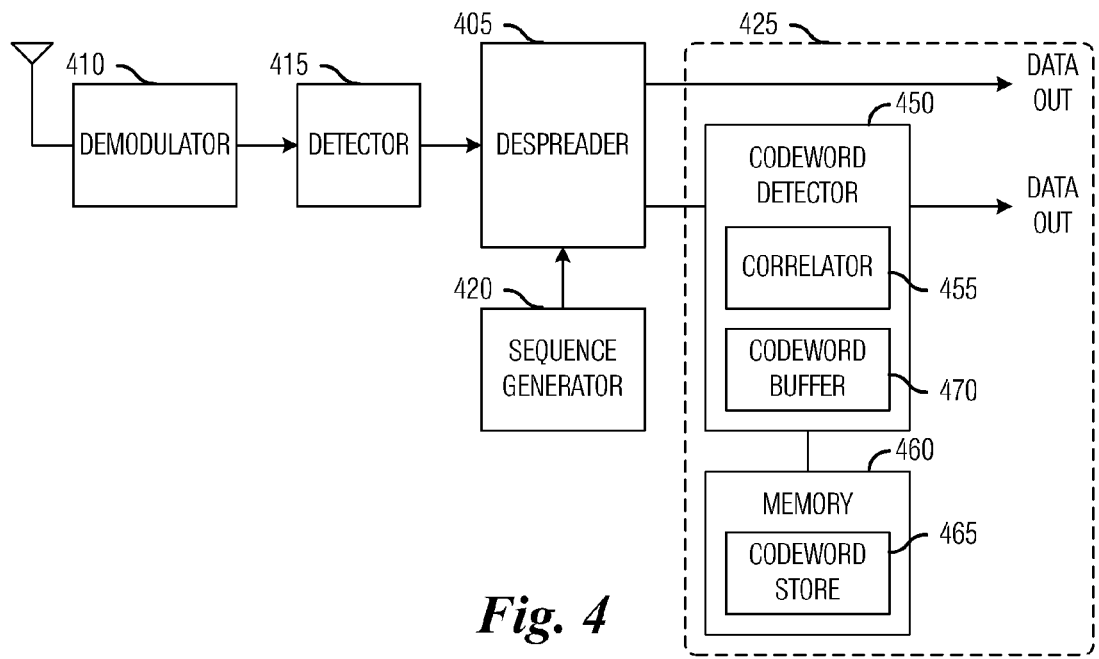
*Fig. 4*

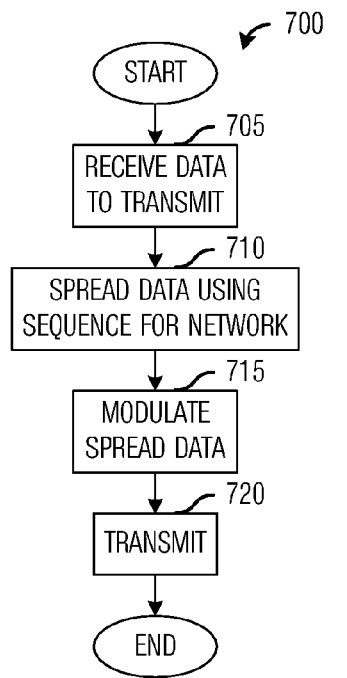
*Fig. 7a*
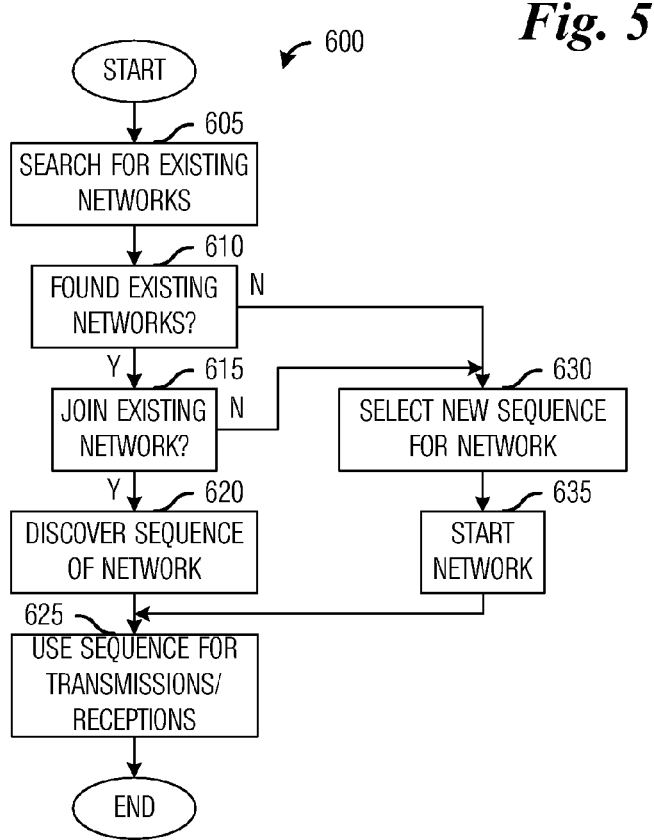
*Fig. 5*
*Fig. 6*
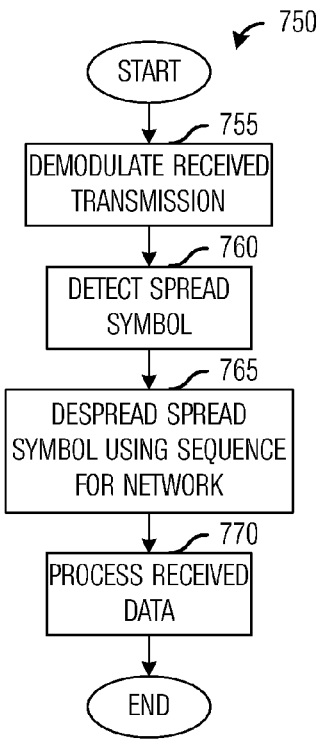
*Fig. 7b*

SYSTEM AND METHOD FOR WIRELESS COMMUNICATIONS

TECHNICAL FIELD

The present invention relates generally to a method for wireless communications, and more particularly to a method for enabling the cohabitation of licensed and unlicensed communications devices.

BACKGROUND

In general, there may be two classes of electronic communications devices or simply, communications devices. A first class of communications devices may be licensed communications devices wherein the communications devices communicate over licensed spectra. Licensed communications devices typically communicate over spectrum licensed from governing or regulatory bodies and organizations, such as the Federal Communications Commission in the United States. Licensed communications devices may be able to use the licensed spectrum generally without having to consider the possibility of interference from other electronic devices or causing interference to other electronic devices operating within the licensed spectrum.

A second class of communications devices may be unlicensed communications devices wherein the communications devices communicate over spectrum that is not licensed to the devices. Unlicensed communications devices usually operate under a requirement that they do not interfere with other communications devices while being able to tolerate interference from other communications devices.

However, in some licensed spectrum, the licensed spectrum is not fully utilized and there has been a drive by regulators, developers, users, and so forth, to more fully use the valuable bandwidth. For example, in the portion of the spectrum dedicated to television transmissions, which occupies spectrum ranging from about 54 MHz to 72 MHz, about 76 MHz to 88 MHz, about 174 MHz to 216 MHz, and about 470 MHz to 806 MHz, in about 6 MHz channels, a significant portion of the available bandwidth is not being utilized. For example, within a given operating area, there may be, on average, about 5 to 20 actively transmitting television channels with the remainder of the television spectrum remaining substantially unused.

This bandwidth may be used to provide high-speed broadband access, especially in rural areas that are typically not served by cable or telephone high-speed broadband providers. The bandwidth available in the television broadcast spectrum may be used to create a wireless rural area network (WRAN). However, since this is licensed spectrum, the licensed electronic devices using the licensed spectrum must not be interfered with.

FIG. 1 is a diagram of a television broadcast network 100 having a WRAN operating in the vicinity. The television broadcast network 100 includes a television (TV) broadcast tower 105 that may be used to transmit television programs to customer premises equipment (CPE), such as television sets 110-112, and so forth. The transmissions may have a practical range (a transmission coverage area 120) that may be dependent on the operating environment, such as the terrain, the presence of other television channels broadcasting over the same frequency bands, and so forth. CPE outside of the transmission coverage area 120, such as CPE 125, may not be able to receive the television program transmissions or the quality of the received television program transmissions may not be acceptable.

The WRAN may be achieved using a WRAN broadcast tower 130. The WRAN broadcast tower 130 may transmit data to and receive data from CPE capable of data communications, such as CPE 135-136. The CPE may be able to transmit and receive directly to and from the WRAN broadcast tower 130. Additionally, transmissions from the WRAN broadcast tower 130 may be received by repeaters, such as repeater 140, that may be used to allow CPE, such as the CPE 125, outside of the transmission coverage area 120 the ability to receive information. The repeaters may also be able to transmit information back to the WRAN broadcast tower 130.

In addition to data capable CPE and data incapable CPE, there may be other licensed electronic equipment, such as wireless intercom systems, wireless video assist systems, wireless interrupted feedback systems, wireless microphones, and so forth. These licensed electronic devices may be referred to collectively as Part 74 devices. In FIG. 1, the Part 74 devices are illustrated as P74, such as P74 145. Since the Part 74 devices are licensed electronic equipment, their communications need to take precedence over the WRAN broadcast tower's communications with the data capable CPE.

SUMMARY OF THE INVENTION

These and other problems are generally solved or circumvented, and technical advantages are generally achieved, by embodiments of a system and a method for enabling the cohabitation of licensed and unlicensed communications devices.

In accordance with an embodiment, a method for communicating in a wireless network is provided. The method includes at a receiver, receiving transmitted data, demodulating the transmitted data to produce a spread symbol, despreading the spread symbol to produce received data, and processing the received data. The despreading includes using an orthogonal sequence selected from a list of orthogonal sequences for use by all transmissions in the wireless network.

In accordance with another embodiment, a method is provided. The method includes at a protecting device, searching for a wireless network, in response to a determining that the wireless network exists and that the protecting device is to join the wireless network, discovering an orthogonal sequence used to spread transmissions in the wireless network, and using the orthogonal sequence to spread transmissions made by the protecting device. The method also includes in response to a determining that the wireless network exists and that the protecting device is to not join the wireless network, selecting a second orthogonal sequence from a list of unused orthogonal sequences, creating a second wireless network, and using the second orthogonal sequence to spread transmissions made in the second wireless network.

In accordance with another embodiment, a wireless communications network is provided. The wireless communications network includes a primary protecting device that controls transmissions taking place in the communications network and signals communications information to communications devices not part of the communications network for the purpose of protecting communications of communications devices associated with the communications network, and a secondary protecting device wirelessly coupled to the primary protecting device, the secondary protecting device protects a communications device associated with the communications network by transmitting communications information to the primary protecting device after obtaining permission to transmit by transmitting a codeword selected from a list of codewords. Transmissions made by the primary protecting device are spread by an orthogonal sequence selected from a list of unused orthogonal sequences, and transmissions made by the secondary protecting device are spread by the orthogonal sequence assigned to the wireless network.

An advantage of an embodiment is that the embodiment allows higher spectral efficiency. Higher spectral efficiency may be achieved since a single network may occupy a frequency band in its entirety. Therefore, transmissions may occur at a high data rate since the entirety of the available bandwidth may be dedicated to the transmission of the single network.

A further advantage of an embodiment is that the embodiment allows multiple wireless networks may operate within a single region simultaneously.

Yet another advantage of an embodiment is that the embodiment may have a lower level of complexity than other multiple access techniques, such as time-division multiple access, wherein an accurate synchronization technique is required. This may lead to a simpler and less expensive system.

Another advantage of an embodiment is that multiple networks may be moved to a different location with different networks by simply changing their orthogonal codewords. As long as the networks use unique orthogonal codewords, their communications will not interfere.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 3a is a diagram of a portion of a transmitter;

FIG. 3b is a diagram of a codeword generated by concatenating two shorter length sequences;

FIG. 4 is a diagram of a portion of a receiver;

FIG. 5 is a diagram of a list of length eight orthogonal sequences;

FIG. 6 is a diagram of a sequence of events for joining or forming a wireless network;

FIG. 7a is a diagram of a sequence of events for transmitting data in a wireless network; and FIG. 7b is a diagram of a sequence of events for receiving data in a wireless network.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless network compliant to IEEE 802.22 Task Group 1 (IEEE 802.22 TG1) technical standards for use in protecting communications of licensed communications devices while providing unused bandwidth to unlicensed communications devices. The invention may also be applied, however, to other wireless networks used to control access to communications media using orthogonal codewords.

Figure 1:
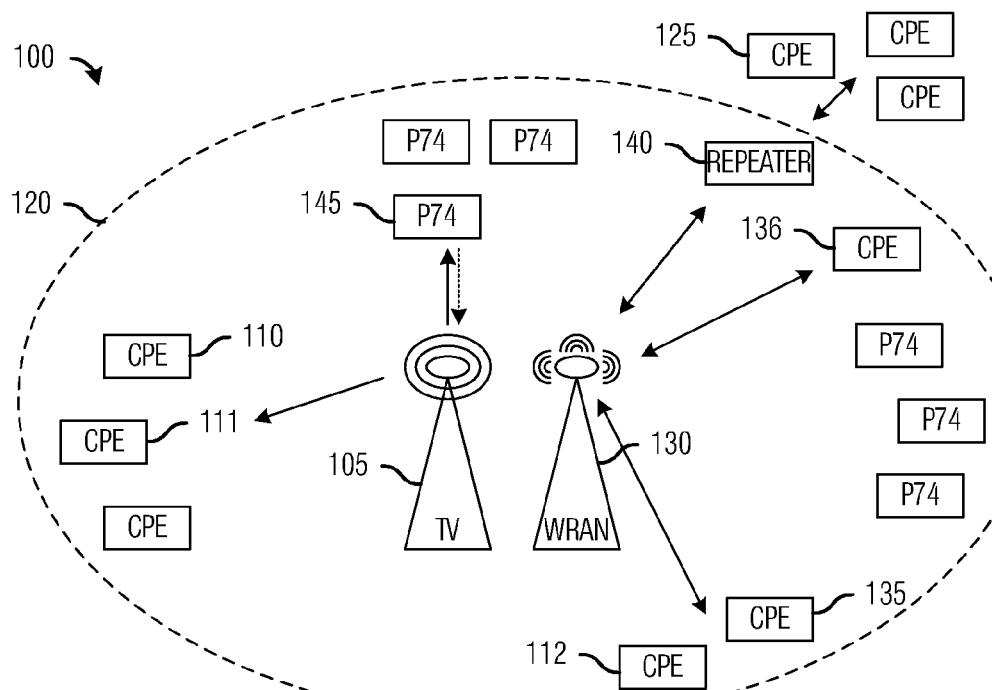
FIG. 1 is a diagram of a television broadcast network having a WRAN operating in the vicinity.
Figure 2:
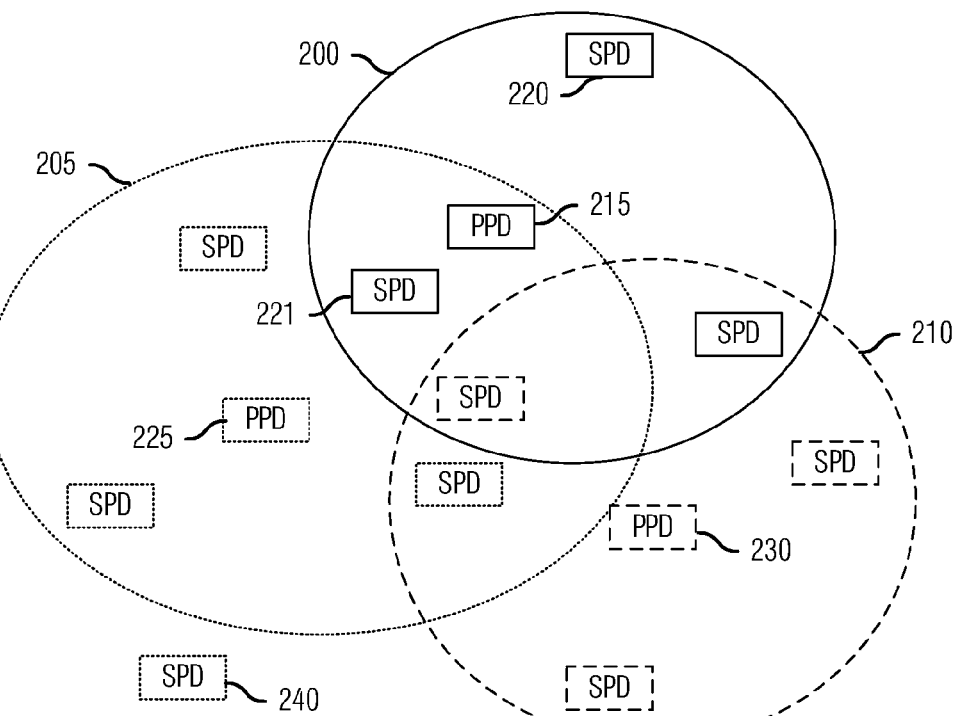
FIG. 2 is a diagram of several wireless networks.

FIG. 2 is a diagram of several wireless networks, such as wireless network 200, wireless network 205, and wireless network 210, compliant to the IEEE 802.22 TG1 technical standards. An IEEE 802.22 TG1 compliant wireless network, such as the wireless network 200, may be used to protect the communications of licensed communications devices, such as Part 74 devices, that are a part of a licensed network. The wireless network 200 includes protecting devices that may be used to protect licensed communications devices operating in their own wireless network, but may be associated with the protecting devices. A protecting device may be a beaconing device that may be used to inform other electronic devices (both licensed and unlicensed) operating in the vicinity of the wireless network 200 of the presence of a licensed communications device that is being protected by the protecting device. A single protecting device may protect one or more licensed communications devices.

There may be two different types of protecting devices: a primary protecting device (PPD) and a secondary protecting device (SPD). A PPD, such as PPD 215, may be used to control the transmissions of beacons by SPDs, such as SPD 220 and SPD 221, in the wireless network 200. In addition to controlling the transmissions of beacons by SPDs in its network, the PPD 215 may also protect one or more licensed communications devices. An SPD may become a PPD if the SPD desires to create a wireless network, such as the wireless network 200, to protect licensed communications devices. Alternatively, an SPD may elect to join an existing wireless network and remain an SPD. In addition to its own protected devices, a PPD may aggregate information regarding protected licensed communications devices protected by SPDs in its wireless network and may provide this information to networks of unlicensed communications devices, such as a WRAN, operating in the vicinity. The networks of unlicensed communications devices may then take steps to avoid communicating in frequency bands being used by the protected licensed communications devices. Additionally, the transmission of beacons may inform unlicensed communications devices about the presence of protected licensed communications devices operating in the vicinity.

A summary of technical specifications for a protecting device is as follows:

Frequency Used: 309.4406 KHz offset from lower edge of each TV band

Chip Rate: 76.873 Kchips/sec

Symbol Rate: 9.6091 KBaud

Occupied Bandwidth: 77 KHz with −3 dB suppression

110 KHz with −20 dB suppression

Modulation: Differential Quadrature Phase Shift Keying (DQPSK)

Spreading/despreading: 8 chips/bit

Information Transmitted Subband information to be protected.

When an SPD, such as the SPD 220, desires to transmit is beacon, the SPD 220 may randomly select a codeword from a list of possible codewords and transmit the selected codeword within a request to send (RTS) period of a superframe. If the SPD 220 detects an acknowledgment (ACK) from the PPD 215 within an Ack/Nack period (ANP) in the superframe in which it transmitted the codeword, then the SPD 220 may transmit its beacon during a subsequent superframe. However, if the SPD 220 detects a negative acknowledgment (NACK) or no ACK from the PDD 215 within the ANP, then the SPD 220 may not transmit its beacon and may need to transmit a codeword during an RTS period of another superframe after waiting a period of time to repeat its request for permission to transmit its beacon.

There may be more than one PPD in operation within a general area, with each PPD controlling its own wireless network. For example, the PPD 215 may control the wireless network 200, a PPD 225 may control the wireless network 205, a PPD 230 may control the wireless network 210, and so on. Although there may be overlap in the coverage area of the various wireless networks, an SPD may only belong to a single wireless network and may only be controlled by its own PPD. Also shown is an SPD 240 that has not joined an existing wireless network or formed a wireless network, becoming a PPD.

With multiple wireless networks operating in the vicinity, collisions between transmissions made by the multiple wireless networks may be possible. When a transmission collision occurs, at least some of the transmitted information may be lost, potentially leading to the information being retransmitted. Recovery from the transmission collision, along with retransmission of the information, may decrease the overall performance of the wireless networks. The overall performance of the wireless networks may be dramatically decreased if the frequency of the transmission collisions is high.

One technique that may be used to help prevent transmission collisions is to spread the transmitted information using spreading codes. Generally, a single bit of data may be multiplied with a length N spreading code to produce N chips. If the spreading codes used are orthogonal to one another, then multiple transmissions may take place simultaneously without interference or collisions. In general, the spreading codes are orthogonal to one another if for a set of spreading codes $$\{f_i, i = 1, 2, 3, \dots\} \langle f_i, f_j \rangle = \sum_{k=1}^{m} f_i(k) f_j(k) = \|f_i\|^2 \delta_{ij} = \|f_j\|^2 \delta_{ij}$$

where $$\delta_{ij} = \begin{cases} 1 \text{ if } i = j \\ 0 \text{ if } i \neq j \end{cases}.$$

The use of spreading codes to help prevent transmission collisions is commonly referred to as code division multiple access (CDMA).

Generally, in a wireless network using CDMA, individual communicating devices may use a unique orthogonal spreading code to help prevent transmission collisions. For example, in a CDMA cellular telephone network, each cellular telephone may have its own unique orthogonal spreading code to prevent interference and collisions between transmissions from the various cellular telephones. However, in a wireless network, like the wireless network 200, with a rigid transmission structure, wherein an SPD may transmit only during an RTS period or when given express permission to transmit or a PPD may transmit its beacon signals and responses to transmissions from an SPD, it may be possible to use a single unique orthogonal spreading code for each wireless network to provide sufficient transmission collision avoidance while helping to maintain a low level of complexity in the hardware in the wireless network 200.

FIG. 3a illustrates a high-level view of a portion of a transmitter 300. The transmitter 300 may be a part of an SPD in a wireless network, such as the SPD 220 in the wireless network 200. The transmitter 300 may also be a part of a PPD, such as the PPD 215, in the wireless network 200. The transmitter 300 includes a spreader 305, a data source 310, a sequence generator 315, and a modulator 320. The spreader 305 may be used to spread data provided by the data source 310 with an orthogonal sequence provided by the sequence generator 315. In general, the spreader 305 may take a single bit of data provided by the data source 310 and spread it into N chips, wherein N is the length of the orthogonal sequence. For example, if a bit of data provided by the data source 310 is a +1 and the orthogonal sequence is "−1 +1 −1 +1 −1 +1 −1 +1," then the output of the spreader 305 may be "−1 +1 −1 +1 −1 +1 −1 +1." In the sequences shown herein, a "+1" may represent a "1" while a "−1" may represent a "0." The representations may be used interchangeably. Similarly, if a bit of data provided by the data source 310 is a −1, then the output of the spreader 305 may be "+1 −1 +1 −1 +1 −1 +1 −1." The modulator 320 may be used to modulate the output of the spreader 305 for transmission via an antenna.

The data source 310 may include data and/or information to be included in the transmissions, such as the frequency usage and other information of the licensed communications device(s) being protected by the SPD. This data and/or information may be provided by a data input coupled to a baseband processor or some other form of data processor. The data source 310 may also include control information, such as a codeword generator 350 that may be used in the generation of a selected codeword to be transmitted by an SPD during an RTS period of a superframe and a memory 355 to store a set of possible codewords in a codeword store 360. The codeword generator 350 may include a codeword selector 365, which may be used to select a codeword for transmission from the codeword store 360. As the codeword is being generated, the codeword may be stored in a codeword buffer 370. The codeword may be generated by concatenating shorter length sequences together. The use of shorter length sequences may simplify codeword generation by decreasing computation and storage requirements.

FIG. 3b illustrates a codeword 380 that may be generated by concatenating a codeword A 385 and a codeword B 390, wherein the codeword A 385 and the codeword B 390 may be orthogonal sequences of shorter length than the length of the codeword 380. For example, if the codeword 380 is a length 16 orthogonal sequence, then the codeword A 385 may be a length eight orthogonal sequence and the codeword B 390 may be a length eight orthogonal sequence. Although shown in FIG. 3b to be generated from two shorter length orthogonal sequences having the same length, the codeword may be generated from more than two shorter length orthogonal sequences and the shorter length sequences need not be of the same length. Please refer to a co-assigned patent application entitled "System and Method for Wireless Communications," Ser. No. 12/114,588, filed May 2, 2008, which patent application is incorporated herein by reference, for a detailed description of codeword generation by concatenating shorter length sequences.

The sequence generator 315 may be used to generate the orthogonal sequence used to spread the data provided by the data source 310. The nature of the sequence generator 315 may depend on the orthogonal sequence being used to spread the data. For example, if the orthogonal sequence is a long sequence, then a pseudo-random number (PN) generator may be used to generate the orthogonal sequence as needed. For example, a PN generator may use a linear feedback shift register (LFSR) to generate the orthogonal sequence. However, if the orthogonal sequence is short, perhaps on the order of a few bits, then the sequence generator 315 may simply store the orthogonal sequence in its entirety in a memory or a dedicated storage location and then provide the orthogonal sequence to the spreader 305 as needed. For example, if the orthogonal sequence is a length eight sequence, storing the sequence in a memory may require less hardware than using a PN generator to generate the orthogonal sequence.

FIG. 4 illustrates a high-level view of a portion of a receiver 400. The receiver 400 may be a part of a PPD in a wireless network, such as the PPD 215 of the wireless network 200. The receiver 400 may also be a part of an SPD, such as the SPD 220, of the wireless network 200. The receiver 400 includes a despreader 405, a demodulator 410, a detector 415, a sequence generator 420, and a data sink 425. The despreader 405 may be used to remove an orthogonal sequence used to spread transmitted data. The despreader 405 may remove the orthogonal sequence from spread symbols from a received signal stream after it has been demodulated by a demodulator 410 and a detector 415 may have been used to detect spread symbols in the decoded received signal stream. The orthogonal sequence may be provided by a sequence generator 420.

The despreader 405 may convert a spread symbol that represents an N chip long sequence, wherein N is the length of the orthogonal sequence originally used to spread data, back into a single bit (or symbol) of data. For example, if the spread symbol is "−1 +1 −1 +1 −1 +1 −1 +1" and the orthogonal sequence is "−1 +1 −1 +1 −1 +1 −1 +1," then the single bit of data may be a +1. Similarly, if the spread symbol is "+1 −1 +1 −1 +1 −1 +1 −1" and the orthogonal sequence is "−1 +1 −1 +1 −1 +1 −1 +1," then the single bit of data may be a −1. However, if the orthogonal sequence used to spread a single bit of data is different than the orthogonal sequence used to despread the spread symbol, then the information contained in the spread symbol may not be recovered. For example, if the spread symbol is "+1 +1 +1 +1 +1 +1 +1 +1" and the orthogonal sequence is "−1 +1 −1 +1 −1 +1 −1 +1," then a correlation value computed between the spread symbol and the orthogonal sequence may be "−1 +1 −1 +1 −1 +1 −1 +1" or 0, which may represent zero data recovery.

Data produced by the despreader 405 may be provided to the data sink 425. If the data from the despreader 405 is transmission data, then circuitry in the receiver 400 of the PPD 215 or an SPD 220 may process the data. However, if the data produced by the despreader 405 is a codeword, then the data (the codeword) may be provided to a codeword detector 450 that may be used to determine the codeword received by the receiver 400. The codeword detector 450 includes a correlator 455 that may correlate the data with members from a set of possible codewords stored in a memory 460, such as a codeword store 465 in the memory 460, to determine the received codeword. As the codeword is being determined, the codeword may be stored in a codeword buffer 470. If the codeword was generated by concatenating shorter length sequences, the determination of the codeword may occur in stages, with each stage determining one of the shorter length sequences used to generate the codeword. This may reduce correlation computation and frequency, as well as storage space requirements. Please refer to previously mentioned, co-assigned patent application entitled "System and Method for Wireless Communications," U.S. patent application Ser. No. 12/114,588, filed May 2, 2008, for a detailed description of the multiple stage determination of a codeword. After the codeword has been determined, the codeword may be provided to other circuitry in the receiver 400 of the PPD 215 or an SPD 220, which may process the codeword and operate accordingly.

FIG. 5 illustrates a list of possible orthogonal sequences 500. The list of possible orthogonal sequences 500 includes eight length eight orthogonal sequences, such as a second length eight sequence "SEQUENCE INDEX 2" 505, which may be a sequence "0 1 0 1 0 1 0 1" 560, that may be used to facilitate multiple access by a wireless network, such as the wireless network 200. Each of the eight length eight orthogonal sequences may be assigned to a wireless network and may be used to spread transmissions by protecting devices in the wireless network, including the PPD and SPDs in the wireless network.

The assignment of a length eight orthogonal sequence to a wireless network may be made by random selection, wherein a wireless network may be assigned a length eight orthogonal sequence from available length eight orthogonal sequences. Alternatively, a length eight orthogonal sequence may be assigned to a wireless network based on frequency bands being protected by the wireless network. For example, the assignment may be made based on a highest frequency band, a lowest frequency band, a busiest frequency band, a most idle frequency band, and so forth.

The length eight orthogonal sequences shown in FIG. 5 are commonly referred to as Walsh codes of length eight. Although shown in FIG. 5 to be Walsh codes, other length eight orthogonal sequences may be used, as long as they are orthogonal and unique. Therefore, the illustration of Walsh codes should not be construed as being limiting to either the scope or the spirit of the embodiments.

FIG. 6 illustrates a sequence of events 600 for joining or forming a wireless network. The sequence of events 600 may be illustrative of an SPD joining or forming a wireless network, such as the wireless network 200. After an SPD, such as the SPD 240, is powered on, after being reset, moved, reconfigured, initialized, or so forth, the SPD 240 may be interested in joining an existing wireless network or forming a new wireless network. The joining or forming of a wireless network may begin with the SPD 240 searching a frequency band of interest to determine if other SPDs and/or PPDs are active, in other words, the SPD 240 may search for existing networks (block 605). The SPD 240 may search frequency bands used by wireless networks to communicate information regarding protected licensed communications devices.

If the SPD 240 was able to detect transmissions from existing wireless networks (block 610), then the SPD 240 may need to determine if it wishes to join one of the existing wireless networks or create its own wireless network (block 615). If the SPD 240 decides to join an existing wireless networks, then the SPD 240 may need to become synchronized with the existing wireless network and discover an orthogonal sequence being used by the existing wireless network (block 620). The SPD 240 may become synchronized with the existing wireless network by listening and decoding synchronization beacons transmitted by the existing wireless network during a beacon period of transmissions made by the existing wireless network. After determining the orthogonal sequence used by the existing wireless network, the SPD 240 may begin to transmit transmission permission requests and so forth, using the orthogonal sequence to spread its transmissions (block 625).

If the SPD 240 was able to detect transmissions from existing wireless networks (block 610) and if the SPD 240 finds that there are more than one existing wireless network and if the SPD 240 decides to join an existing wireless network (block 615), then the SPD 240 may need to select one of the existing wireless networks to join. The SPD 240 may base its decision on which existing wireless network to join based on considerations such as the number of protecting devices already in each of the existing wireless networks, the number of protected licensed communications devices in each of the existing wireless networks, the signal strength of the transmissions made in each of the existing wireless networks, and so forth. In general, the SPD 240 may prefer to select an existing wireless network with a low number of protecting devices, protected licensed communications devices, high transmission signal strength, and so on.

After choosing the existing wireless network to join, the SPD 240 may follow the above described events to become synchronized with the existing wireless network and discover an orthogonal sequence being used by the existing wireless network (block 620) and then use the orthogonal sequence to spread its transmissions (block 625).

If the SPD 240 was able to detect transmissions from existing wireless networks (block 610) but decided not to join an existing wireless network (block 615) or if the SPD 240 was not able to detect transmissions from existing wireless networks (block 610), then the SPD 240 may create its own wireless network. In order to create its own wireless network, the SPD 240 may need to become a PPD. Additionally, the SPD 240 may need to select an orthogonal sequence to be used to spread transmissions in its wireless network (block 630). The SPD 240 may randomly select an orthogonal sequence from a list of available orthogonal sequences or an orthogonal sequence may be assigned based on spectral characteristics of licensed communications devices being protected by the SPD 240, such as the number of a lowest, highest, busiest, most idle, or so forth, sub-channel being used by the licensed communications devices, for example. Additional spectral characteristics may include the spectral usage of the licensed communications device, a transmission pattern, including transmission frequency, and so forth. After becoming a PPD and selecting the orthogonal sequence, the SPD 240 may start the operation of wireless network (block 635) and begin to transmit using the orthogonal sequence to spread its transmissions (block 625).

FIG. 7a illustrates a sequence of events 700 in the spreading of data in a transmission. The spreading of data in a transmission may occur in all transmissions made in a PPD, such as the PPD 215, or an SPD, such as the SPD 220. For the PPD 215, transmissions may include the transmissions made during a beacon period, an ANP period, and so forth, while for the SPD 220, transmissions may include transmissions made during an RTS period, as well as permitted transmissions made during certain beacon periods. The spreading of data in a transmission may begin with a receiving of data intended for the transmission (block 705). The data intended for the transmission may then be spread using an orthogonal sequence, such as one of the eight length eight orthogonal sequences shown in FIG. 5 (block 710). The transmissions made by the PPD 215 and SPD(s) in a single wireless network may be spread using the same orthogonal sequence. After being spread using the orthogonal sequence, the spread data may be modulated by a modulator (block 715) and then transmitted via an antenna (block 720)

FIG. 7b illustrates a sequence of events 750 in the despreading of data in a received transmission. The despreading of data in a transmission may occur in all transmissions received by a PPD, such as the PPD 215, or an SPD, such as the SPD 220. For the PPD 215, the received transmissions may include transmissions made by the SPD 220 during an RTS period, as well as permitted transmissions made during certain beacon periods, while for the SPD 220, the received transmissions may include transmissions made by the PPD 215 during a beacon period, a ANP period, and so forth. The despreading of data may begin with a demodulating of a received transmission (block 755). This may then be followed with a detecting of a spread data symbol (block 760). The spread data symbol may be despread using an orthogonal sequence, such as one of the eight length eight orthogonal sequences shown in FIG. 5 (block 765). The received transmissions at the PPD 215 and SPD(s) in a single wireless network may be despread using the same orthogonal sequence. After being despread using the orthogonal sequence, the data may receive further processing by circuit components in the PPD 215 or the SPD 220 (block 770).

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communicating in a wireless network, the method comprising:
   receiving, by a communications device, beacons from a plurality of primary protecting devices, where each of the plurality of primary protecting devices are associated with a different one of a plurality of wireless networks;
   demodulating the beacons to produce spread symbols;
   analyzing the spread symbols to determine which sequences in a list of orthogonal sequences are being used by the primary protecting devices, wherein each of the sequences in the list of orthogonal sequences are orthogonal to one another, and wherein each of the plurality of primary protecting devices use a different sequence in the list of orthogonal sequences; and
   establishing, by the communications device, a new wireless network for communicating unlicensed transmissions by selecting an unused orthogonal sequence from the list of orthogonal sequences, and transmitting a new beacon in accordance with the selected orthogonal sequence.

2. The method of claim 1, wherein transmitting a new beacon in accordance with the selected orthogonal sequence comprises:
   spreading data in accordance with the selected orthogonal sequence to produce a new spread symbol;
   modulating the new spread symbol to produce the new beacon; and
   transmitting the new beacon.

3. The method of claim 1, wherein demodulating the beacons includes detecting the spread symbols in the beacons.

4. The method of claim 1, wherein selecting an unused orthogonal sequence from the list of orthogonal sequences comprises: selecting an unused orthogonal sequence from the list of orthogonal sequences based on spectral characteristics of communications devices to be included in the new wireless network.

5. The method of claim 4, wherein the list of orthogonal sequences comprises:

| Sequence Index | Sequence |
|---|---|
| 1 | 0 0 0 0 0 0 0 0 |
| 2 | 0 1 0 1 0 1 0 1 |
| 3 | 0 0 1 1 0 0 1 1 |
| 4 | 0 1 1 0 0 1 1 0 |
| 5 | 0 0 0 0 1 1 1 1 |
| 6 | 0 1 0 1 1 0 1 0 |
| 7 | 0 0 1 1 1 1 0 0 |
| 8 | 0 1 1 0 1 0 0 1. |

6. A method comprising:
   at a protecting device,
      searching for a wireless network;
      in response to a determining that the wireless network exists and that the protecting device is to join the wireless network,
         discovering an orthogonal sequence used to spread transmissions in the wireless network, and
         using the orthogonal sequence to spread transmissions made by the protecting device; and
      in response to a determining that the wireless network exists and that the protecting device is to not join the wireless network,
         selecting a second orthogonal sequence from a list of unused orthogonal sequences,
         creating a second wireless network, and
         using the second orthogonal sequence to spread transmissions made in the second wireless network.

7. The method of claim 6, further comprising:
   in response to a determining that the wireless network does not exist,
      selecting a third orthogonal sequence from a list of unused orthogonal sequences,
      creating a third wireless network, and
      using the third orthogonal sequence to spread transmissions made in the third wireless network.

8. The method of claim 7, wherein the creating the third wireless network comprises switching an operating mode of the protecting device.

9. The method of claim 8, wherein the switching comprises changing from a secondary protecting device to a primary protecting device.

10. The method of claim 6, wherein the discovering the orthogonal sequence comprises:
   detecting synchronization pulses transmitted in the wireless network during a beacon period; and
   processing the synchronization pulses.

11. The method of claim 6, wherein the selecting the second orthogonal sequence comprises selecting the second orthogonal sequence from a list of length eight orthogonal sequences.

12. The method of claim 11, wherein the list of length eight orthogonal sequences comprises:

| Sequence Index | Sequence |
|---|---|
| 1 | 0 0 0 0 0 0 0 0 |
| 2 | 0 1 0 1 0 1 0 1 |
| 3 | 0 0 1 1 0 0 1 1 |
| 4 | 0 1 1 0 0 1 1 0 |
| 5 | 0 0 0 0 1 1 1 1 |
| 6 | 0 1 0 1 1 0 1 0 |
| 7 | 0 0 1 1 1 1 0 0 |
| 8 | 0 1 1 0 1 0 0 1. |

13. The method of claim 11, wherein the selecting the second orthogonal sequence comprises selecting the second orthogonal sequence based on a number of a frequency band used by communications devices associated with the wireless network.

14. The method of claim 6, further comprising:
   in response to a determining that a plurality of wireless networks exist and that the protecting device is to join one of the multiple wireless networks,
      choosing a selected wireless network from the plurality of wireless networks,
      discovering a fourth orthogonal sequence for use to spread transmissions in the selected wireless network, and
      using the fourth orthogonal sequence to spread transmissions made by the protecting device.

15. The method of claim 14, wherein the choosing the selected wireless network comprises choosing the selected wireless network based on a criteria, wherein the criteria is selected from the group consisting of: a number of protecting devices in each of the wireless networks in the plurality of wireless networks, a number of communications devices associated with each of the wireless networks in the plurality of wireless networks, a signal strength of transmissions made by each of the wireless networks in the plurality of wireless networks, and combinations thereof 16. A wireless communications network comprising:
   a primary protecting device configured to control transmissions taking place in the communications network and to signal communications information to communications devices not part of the communications network for the purpose of protecting communications of communications devices associated with the communications network, wherein transmissions made by the primary protecting device are spread by an orthogonal sequence selected from a list of unused orthogonal sequences; and
   a secondary protecting device wirelessly coupled to the primary protecting device, the secondary protecting device configured to protect a communications device associated with the communications network by transmitting communications information to the primary protecting device after obtaining permission to transmit by transmitting a codeword selected from a list of codewords, wherein transmissions made by the secondary protecting device are spread by the orthogonal sequence assigned to the wireless network.

17. The communications network of claim 16, wherein the primary protecting device comprises:
a transmitter to transmit signals over the air; and
a receiver to receive transmissions, the receiver comprising,
a demodulator configured to demodulate a received signal provided by a signal input, producing a decoded received signal,
a detector coupled to the demodulator, the detector configured to detect a spread symbol in the decoded received signal,
a despreader coupled to the detector, the despreader configured to despread the spread symbol using the orthogonal sequence, producing a despread received signal, and
a codeword detector coupled to the despreader, the codeword detector configured to determine a received codeword contained in the despread received signal.

18. The communications network of claim 16, wherein the secondary protecting device comprises:
a receiver to receive transmissions; and
a transmitter to transmit signals, the transmitter comprising,
a codeword generator configured to generate a codeword from a set of possible codewords,
a memory coupled to the codeword generator, the memory to store the set of possible codewords,
a spreader coupled to the codeword generator, the spreader to spread the codeword or data from a data input using the orthogonal sequence, producing spread data, and
a modulator coupled to the spreader, the modulator configured to modulate the spread data for transmission.

19. The communications network of claim 16, wherein the communications devices associated with the communications network comprises licensed communications devices communicating over licensed spectra.

20. A protecting device comprising:
a processor; and
a computer readable storage medium storing programming for execution by the processor, the programming including instructions to:
search for a wireless network;
in response to a determining that the wireless network exists and that the protecting device is to join the wireless network,
discover an orthogonal sequence used to spread transmissions in the wireless network, and
use the orthogonal sequence to spread transmissions made by the protecting device; and
in response to a determining that the wireless network exists and that the protecting device is to not join the wireless network,
select a second orthogonal sequence from a list of unused orthogonal sequences,
create a second wireless network, and
use the second orthogonal sequence to spread transmissions made in the second wireless network.

21. A communications device comprising:
a processor; and
a computer readable storage medium storing programming for execution by the processor, the programming including instructions to:
receive beacons from a plurality of primary protecting devices, where each of the plurality of primary protecting devices are associated with a different one of a plurality of wireless networks;
demodulate the beacons to produce spread symbols;
analyze the spread symbols to determine which sequences in a list of orthogonal sequences are being used by the primary protecting devices, wherein each of the sequences in the list of orthogonal sequences are orthogonal to one another, and wherein each of the plurality of primary protecting devices use a different sequence in the list of orthogonal sequences; and
establish a new wireless network for communicating unlicensed transmissions by selecting an unused orthogonal sequence from the list of orthogonal sequences, and transmitting a new beacon in accordance with the selected orthogonal sequence.

22. The communications device of claim 21, wherein the instructions to transmit the new beacon in accordance with the selected orthogonal sequence include instructions to:
spread data in accordance with the selected orthogonal sequence to produce a new spread symbol;
modulate the new spread symbol to produce the new beacon; and
transmit the new beacon.

23. The communications device of claim 21, wherein the instructions to demodulate the beacons include instructions to detect the spread symbols in the beacons.

24. The communications device of claim 21, wherein the instructions to select an unused orthogonal sequence from the list of orthogonal sequences includes instructions to:
select an unused orthogonal sequence from the list of orthogonal sequences based on spectral characteristics of communications devices to be included in the new wireless network.

25. The communications device of claim 21, wherein the list of orthogonal sequences comprises:

| Sequence Index | Sequence |
| --- | --- |
| 1 | 0 0 0 0 0 0 0 0 |
| 2 | 0 1 0 1 0 1 0 1 |
| 3 | 0 0 1 1 0 0 1 1 |
| 4 | 0 1 1 0 0 1 1 0 |
| 5 | 0 0 0 0 1 1 1 1 |
| 6 | 0 1 0 1 1 0 1 0 |
| 7 | 0 0 1 1 1 1 0 0 |
| 8 | 0 1 1 0 1 0 0 1. |

* * * * *